USOO6313841B1

(12) United States Patent
Ogata et al.

(10) Patent No.: US 6,313,841 B1
(45) Date of Patent: Nov. 6, 2001

(54) PARALLEL VOLUME RENDERING SYSTEM WITH A RESAMPLING MODULE FOR PARALLEL AND PERSPECTIVE PROJECTIONS

(75) Inventors: Masato Ogata, Fujisawa (JP); TakaHide Ohkami, Newton; Hugh C. Lauer, Concord, both of MA (US)

(73) Assignee: Terarecon, Inc., San Mateo, CA (US)

( * ) Notice: Subject to any disclaimer, the term of this patent is extended or adjusted under 35 U.S.C. 154(b) by 0 days.

(21) Appl. No.: 09/059,155

(22) Filed: Apr. 13, 1998

(51) Int. Cl.[7] .................................................. G06T 17/00
(52) U.S. Cl. ............................................ 345/424; 345/427
(58) Field of Search .................................... 345/419, 424, 345/427, 440, 502, 505

(56) References Cited

U.S. PATENT DOCUMENTS

| 4,953,087 | * | 8/1990 | Crawford .............................. 345/419 |
| 5,317,689 | * | 5/1994 | Nack et al. ........................... 345/505 |
| 5,544,283 | * | 8/1996 | Kaufman et al. ..................... 345/427 |
| 5,594,842 | * | 1/1997 | Kaufman et al. ..................... 345/424 |
| 5,760,781 | * | 6/1998 | Kaufman et al. ..................... 345/502 |
| 5,847,711 | * | 12/1998 | Kaufman et al. ..................... 345/424 |

* cited by examiner

*Primary Examiner*—Cliff N. Vo
(74) *Attorney, Agent, or Firm*—Dirk Brinkman

(57) ABSTRACT

A volume rendering system re-samples voxels read from a voxel memory to generate samples along perspective rays cast from a center of projection using a level of detail value. Color computations are performed with the samples to produce pixels for a baseplane image. The level of detail is computed, at each plane of samples perpendicular to a principal viewing axis, from the current sample position and the distance between the center of projection and the baseplane; the principal viewing axis is the coordinate axis in a rendered volume most parallel with a viewing vector. The level of detail provides a measure of the distance between two neighboring perspective rays at each plane and is used to determine the number of voxels and weights for these voxels required to compute a single sample at each plane. Multi-resolution datasets prepared for different levels of details are used to simplify the resampling operation by limiting the number of voxels required to compute a single sample.

26 Claims, 19 Drawing Sheets

PARALLEL VOLUME RENDERING SYSTEM WITH A RESAMPLING MODULE FOR PARALLEL AND PERSPECTIVE PROJECTIONS

BACKGROUND OF THE INVENTION

This invention relates to volume rendering systems and more particularly to a volume rendering system capable of rendering volumetric datasets for perspective visual projection using parallel pipeline processing.

Given a set of viewing parameters, a typical volume rendering system renders a volumetric dataset or simply a volume to produce a two-dimensional image by casting parallel rays into the dataset, computing color values at sample points along the rays, and accumulating them to determine the final pixel values. Popular volumetric datasets include medical datasets, such as CT and MRI data, and scientific datasets generated by computer simulation. A volume described by the dataset consists of elements called voxels, each representing some property of the dataset. Voxels are usually defined at intersections of a three-dimensional regular grid and stored in a three-dimensional memory array indexed by voxel position.

One of the major problems with rendering such a volume is the expensive computing cost due to the large number of voxels to process. A typical rendering process for raycasting computes, in software, the color values of samples along each ray by using some form of interpolation with surrounding voxels and accumulates these values to determine the final color of the ray. The rendering cost is in direct proportion to the total number of voxels. An exemplary dataset may be described as an N×N×N matrix, with each three-dimensional coordinate having an associated voxel. Letting N=256 in a first example, there are $256^3$, or 16 million, voxels. Since rays are projected in relatively close proximity to provide sufficient detail in the rendered image, each voxel will be utilized k times on average in the calculation of ray samples, for a total of 16k million times.

Conventional volume rendering systems implemented by software suffer from a performance problem, and are thus unable to perform realtime rendering, because of the large number of operations to perform. There are some methods used to reduce the computing cost. Early ray termination is one example, which terminates a ray when additional samples along the ray are not expected to contribute much to the final color of the ray. Coherency encoding is another example, which encodes spatial coherency in the dataset to avoid processing voxels in empty regions. The performance enhancement obtained by these methods, however, depends on the dataset. It is very difficult for a software-based volume rendering system to achieve the realtime rendering performance independent of the voxel values in the datasets. Some software rendering systems are designed to run on high-performance computers. However, their still suffer from the performance problem, because the number of operations per voxel is not large enough to statistically justify the expensive memory access per voxel.

Some special-purpose hardware systems have been developed to achieve realtime performance by accelerating the volume rendering process. Several pipelines are used, each for rendering operations for one ray. The pipelines generate images for parallel projection, in which the rays are cast into the volume from a point at infinity and therefore all parallel. With this form of parallel ray projection, rendering operations are regular and amenable to parallel pipeline processing in hardware; since the rays are parallel, the distance between the sample locations of two neighboring rays at the same distance from some reference plane is constant, and the offset for each sample location from a respective reference voxel location is also constant. This allows the hardware pipelines, each responsible for a ray, to perform the same sampling and rendering operations, albeit on different combinations of voxels, because the offsets of the sample locations determine the weights for interpolation in sampling operations, and these offsets are the same for each ray and therefore for each pipeline.

Perspective projection is another type of projection, in which rays are cast into a volume from a point, called the center of projection ("COP"), at some finite distance from the volume. With this type of projection, volumes closer to the center of projection appear larger in the images than those far from the center of projection. Because of this property, the generated images are more natural to human eyes than those generated by parallel projection. Since the rays are not parallel in perspective projection, rendering operations are not regular and thus not amenable to parallel pipeline processing in hardware. Specifically, the distance between the sample locations of two neighboring rays changes as the distance from the sample locations to a reference plane changes; the offsets of the sample locations from the respective reference voxel locations also change. This requires unique sampling and rendering operations at each hardware pipeline responsible for a different ray.

For instance, in one prior art configuration for perspective rays, hardware pipelines are organized to compute different rays such that each pipeline, responsible for a first ray, computes all the samples along the ray to determine its final color. When a pipeline finishes the first ray, it processes another ray using similar operations. The major problem in this configuration is that one voxel is typically accessed by multiple pipelines, increasing the total number of memory accesses and memory contentions. To alleviate this problem, the hardware pipelines can be organized such that they read a voxel once and retain it until all the samples requiring that voxel are computed. In this organization each pipeline interleaves the computation of samples for different rays. A first pipeline transfers a voxel to a neighboring pipeline after using it for sample interpolation at one pipeline clock. At the next pipeline clock, the first pipeline receives a different voxel from a neighboring pipeline for the similar sample interpolation for the same ray or a different ray, depending on the operation type. Examples of such an organization of hardware pipelines can be found in Hanspeter Pfister, "Architectures for Real-Time Volume Rendering," Ph.D. Thesis, Department of Computer Science, State University of New York at Stony Brook, December 1996.

The above-mentioned perspective projection problem is especially serious for this type of hardware pipeline organization, because the pipelines are organized to compute different samples for different rays with a regular sequence of voxels from memory. In particular, some pipelines may not have samples to compute using a given voxel because of the increasing distance between the samples of the neighboring rays. This irregularity in applying parallel pipeline processing techniques to perspective projections has not been addressed in conventional hardware pipeline systems.

BRIEF SUMMARY OF THE INVENTION

In order to overcome the disadvantages of conventional volume rendering systems, the present invention comprises a volume rendering system and method with a resampling module which includes a set of resampling units to resample voxels to generate samples along perspective rays cast from the center of projection, and a rendering module which includes rendering units to generate pixels for the baseplane image. The resampling units thus regularize the calculations required for perspective projections by parallizing perspective rays, thus enabling the realtime processing capabilities of parallel-pipeline processing formerly only available with parallel projections.

The volume rendering system is provided having an enhanced capability for producing a realtime image of a volume on a display screen. Voxels describing the volume are read from a voxel memory and are re-sampled in the generation of samples along perspective rays cast from a center of projection. A level of detail value is utilized in determining a number of voxels to be utilized in calculating the sample. Weights are assigned to each voxel contribution as part of this calculation. Color computations using these samples are used to produce pixels for a baseplane image.

The level of detail is computed at each plane of samples perpendicular to a principal viewing axis, the viewing axis of the object coordinate system most parallel with a viewing vector cast into the volume. The sample position within the volume and the shortest distance between the center of projection and the baseplane are utilized to extrapolate the distance between two neighboring perspective rays and to determine the number of voxels and weights to be used in calculating a sample in a particular plane.

Each pipeline connected to a resampling unit continues to retrieve a respective voxel as the distance from the center of projection increases, and a sample is generated therefrom according to range and weight factors from the perspective ray control. This is despite the fact that a given sample so generated may not be valid for any of the projected perspective rays. To compensate for this, the presently disclosed system provides a valid/invalid indication to each sample, indicating whether the associated sample is to be processed by the rendering module as a contribution to a pixel.

In order to further improve the efficiency of the presently disclosed method and apparatus, through a reduction in the number of operations required in sampling, voxels are selectively combined to calculate multi-resolution datasets for each of different levels of detail. The resampling operation is thus simplified by limiting the number of voxels required to compute a single sample. Instead, using the level of detail for the sample to be calculated, the resampling unit is capable of retrieving select multi-resolution datasets for use in the resampling process.

BRIEF DESCRIPTION OF THE SEVERAL VIEWS OF THE DRAWING

The invention will be more fully understood from the following detailed description, in conjunction with the accompanying figures, of which.

DETAILED DESCRIPTION OF THE INVENTION

The present invention provides a resampling unit 2 which receives voxels as inputs from a voxel memory 1. The voxels collectively characterize a three-dimensional dataset. A ray, defined by a perspective ray control 4, is cast into the volume in order to generate a pixel in an image plane representing the color contribution of plural samples calculated along the ray. Each of these samples is generated by factoring in the information provided by voxels proximate each sample point. The number voxels, and weight accorded to each, used in generating a sample for a perspective ray is calculated in the resampling unit 2 under the control of the perspective ray control 4, as described below. The sampled voxels are then provided to a rendering module 3 for the accumulation of samples into a respective pixel. These elements are realized in. one or more ASICs or other suitable hardware media.

Figure 1A:
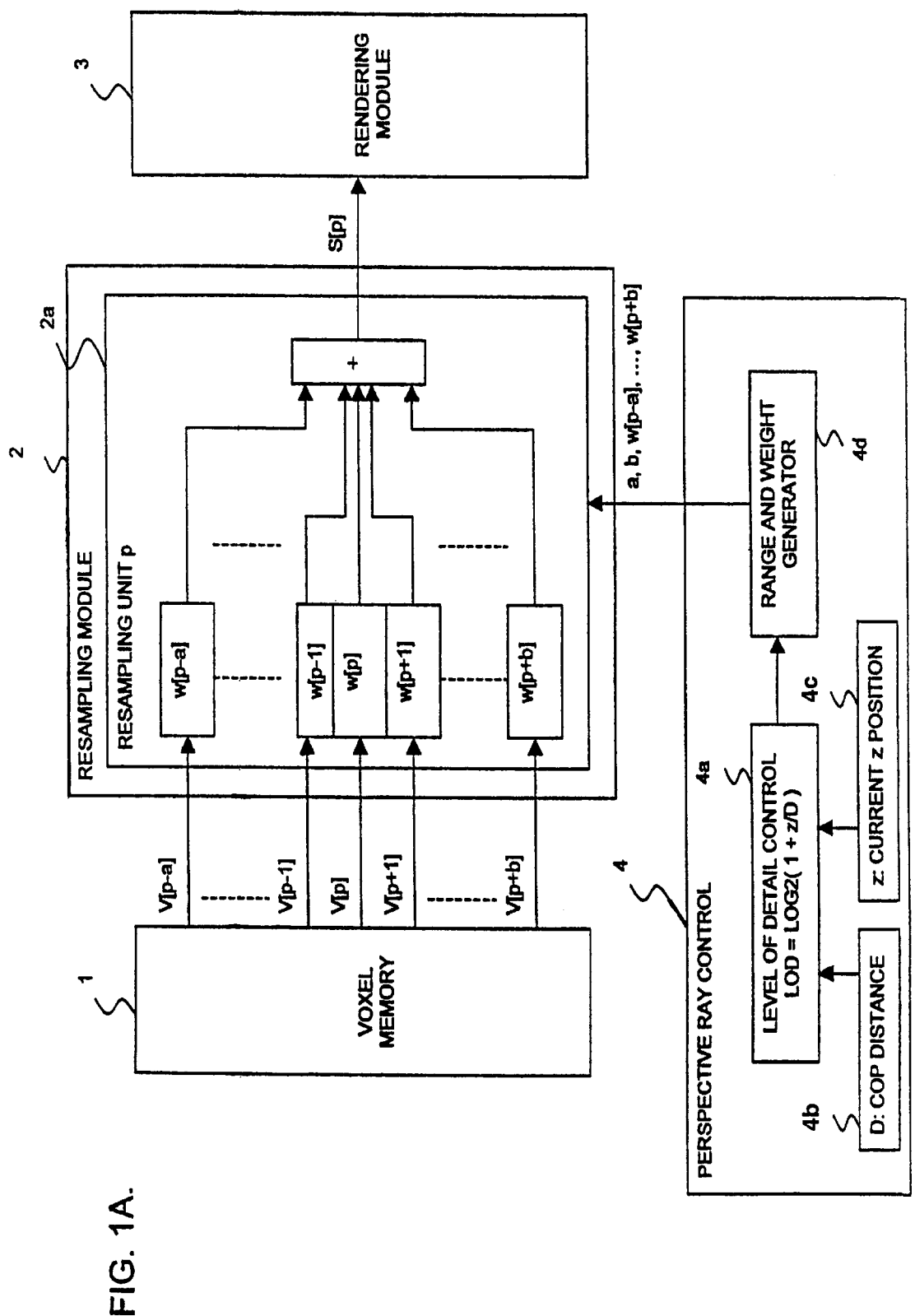
FIG. 1A is a block diagram of a resampling module according to the present invention that performs resampling operations on voxels to generate samples.

Referring now to FIG. 1A, voxels V[p−a], ..., V[p+b] read from voxel memory 1 are weighted and summed in the resampling unit 2a of the resampling module 2 to produce a sample S[p]. The sample is computed as follows:

$$S[p]=V[p-a]*w[p-a]+ \ldots +V[p]*w[p]+ \ldots +V[p+b]*w[p+b],$$

where w[p−a], ..., w[p], ..., w[p+b] are weights. The resulting sample S[p] is sent to the rendering module 3 for color computations. This resampling operation is controlled by the perspective ray control 4, which determines the number of voxels to be factored into the sample, through the generation of the parameters a and b, and which determines the weight to be accorded to each, through the parameters w[p−a], . . . , w[p+b], for a given nearest voxel p. The perspective ray control 4 includes: a level of detail control 4a, which computes the level of detail ("LOD") based upon the distance D from the center of projection 4b to a baseplane and the z value of the current sampling position 4c by LOD=LOG2(1+z/D), where LOG2 is a base-2 logarithm function; and range and weight generator 4d, which generates a, b, w[p−a], . . . , w[p+b]. FIG. 1A shows only one resampling unit 2a for p.

Figure 1B:
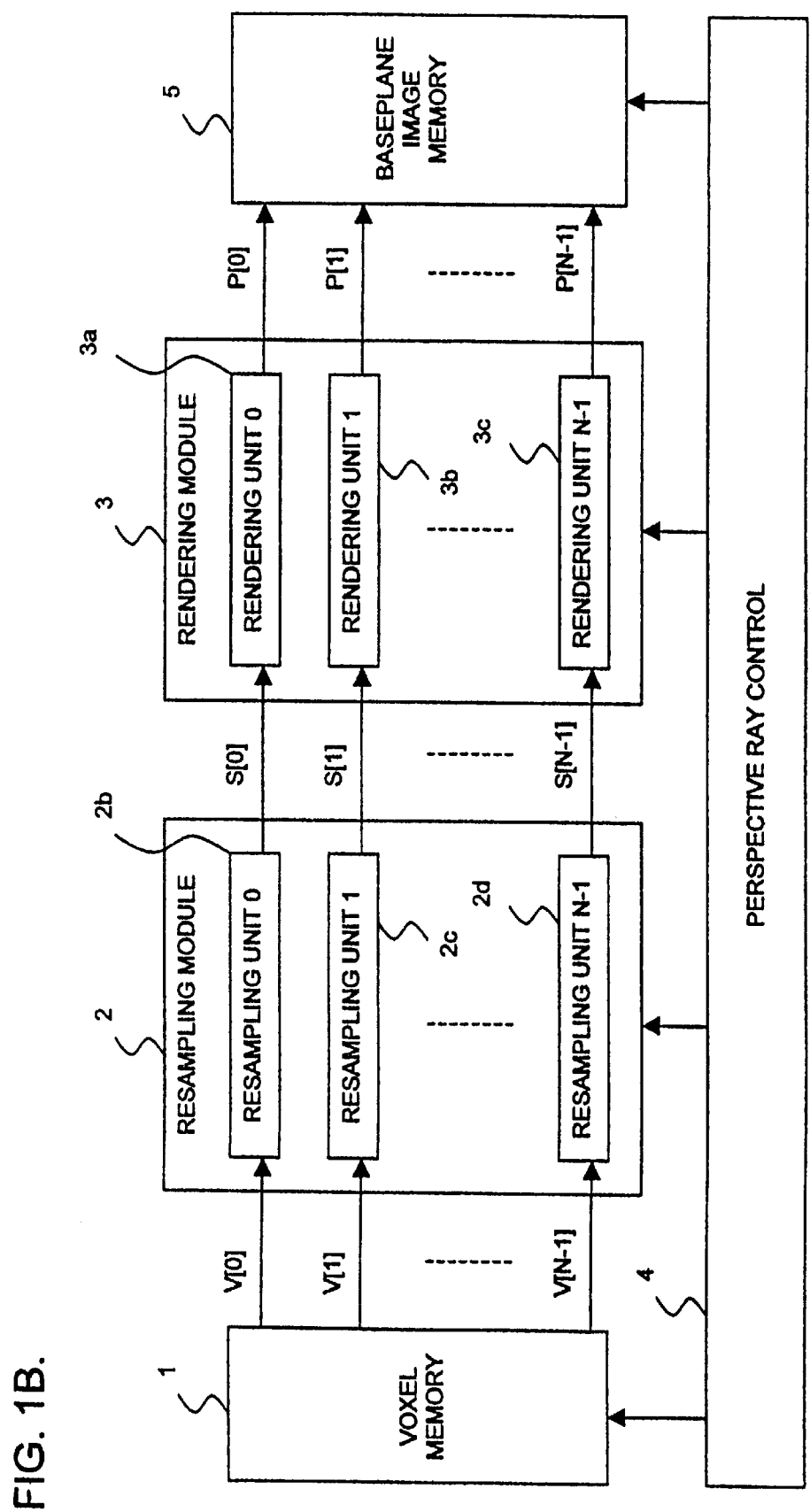
FIG. 1B is a block diagram of rendering system components according to the present invention, and the data and control flows between them.

FIG. 1B shows the major system components and data and control flows between them in the subject system. Voxels are stored in voxel memory 1. N voxels V[0] through V[N−1] are read at the same time and are sent to resampling module 2, which contains N resampling units 2b, 2c, . . . , 2d. Each resampling unit performs the operation illustrated in FIG. 1A. N samples S[0] through S[N−1] produced in resampling module 2 are sent to rendering module 3, which includes N rendering units 3a, 3b, . . . , 3c. Each rendering unit takes a sample from resampling module 2 and produces a pixel. Rendering module 3 produces N pixels P[0] through P[N−1], which are stored in a baseplane image memory 5. Perspective ray control 4 controls voxel memory 1, resampling module 2, rendering module 3, and baseplane image memory 5.

In the subject system, each voxel is read out from voxel memory 1 only once and is then retained in resampling module 2 until all the samples requiring the voxel are computed. In general, one voxel is required for multiple samples on different perspective rays. Samples generated in resampling module 2 are composited for the same perspective ray in rendering module 3. The result of the compositing operation is a pixel for a perspective ray. It is stored in baseplane image memory 5.

Figure 2:
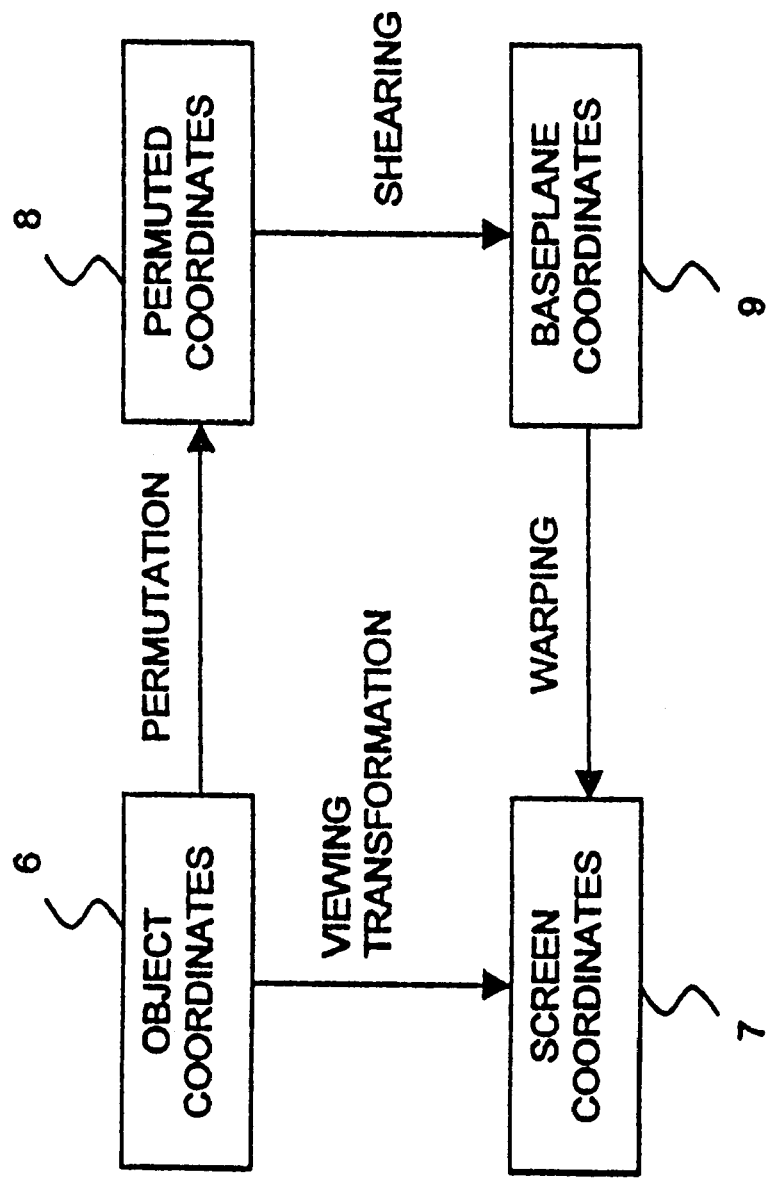
FIG. 2 is a chart of four coordinate systems and transformations between them.

FIG. 2 shows a chart of four coordinate systems and the transformations between them. The positions of voxels in a volume are defined in object coordinates 6. The viewing transformation is applied to points in the object coordinates 6 to obtain those in the screen coordinates 7. This transformation is required to present on a screen the final image produced by volume rendering. Software-based volume rendering systems effectively implement this transformation by casting rays from the pixel positions on a screen into a volume and compositing the color values at sampling points along the rays to produce the final screen image.

In contrast, the viewing transformation is divided into three transformations for the subject system: permutation, shearing, and warping. Permutation transforms points in the object coordinates 6 to those in the permuted coordinates 8.

By way of definition, a viewing matrix is associated with the viewing transformation of object coordinates 6 to screen coordinates 7. A viewing vector is a unit vector normal to a reference plane. A viewing vector defined in screen coordinates 7 is transformed to a viewing vector defined in object coordinates 6 by multiplying the viewing vector in the screen coordinates 7 by the inverse of the viewing matrix. A matrix associated with the permutation is computed from this viewing vector in the object coordinates 6 to permute the three object axes so that the axis most parallel with the viewing vector defined in screen coordinates, called the principal viewing axis, is the z axis and the vector components in the other two axes are non-negative. In the permuted coordinates 8, a ray cast from the screen has a positive non-zero step in the z direction and non-negative steps in the x and y directions. This permutation matrix is pre-computed for the system of the presently disclosed invention. A slice of the object volume is defined as a plane of voxels at the same z location. There are N slices in a volume of size N*N*N.

Shearing transforms points in the permuted coordinates 8 to those in the baseplane coordinates 9. The baseplane is defined as the plane including the first slice of the permuted volume. It is most perpendicular to the viewing vector in object coordinates and closest to the screen. The system of the presently disclosed invention, also referred to herein as the "subject system," effectively performs this shearing transformation by casting rays from the baseplane and compositing the color values along the rays.

Warping transforms points in the baseplane coordinates 8 to those in the screen coordinates 7. In other words, the baseplane image is warped to produce the final screen image. This transformation is a post-processing operation with respect to the subject system.

The basic idea of these transformations are described by P. G. Lacroute in Fast Volume Rendering Using a Shear-Warp Factorization of the Viewing Transformation, Technical Report CSL-TR-95-678, Computer Systems Laboratory, Stanford University, September 1995.

Figure 3:
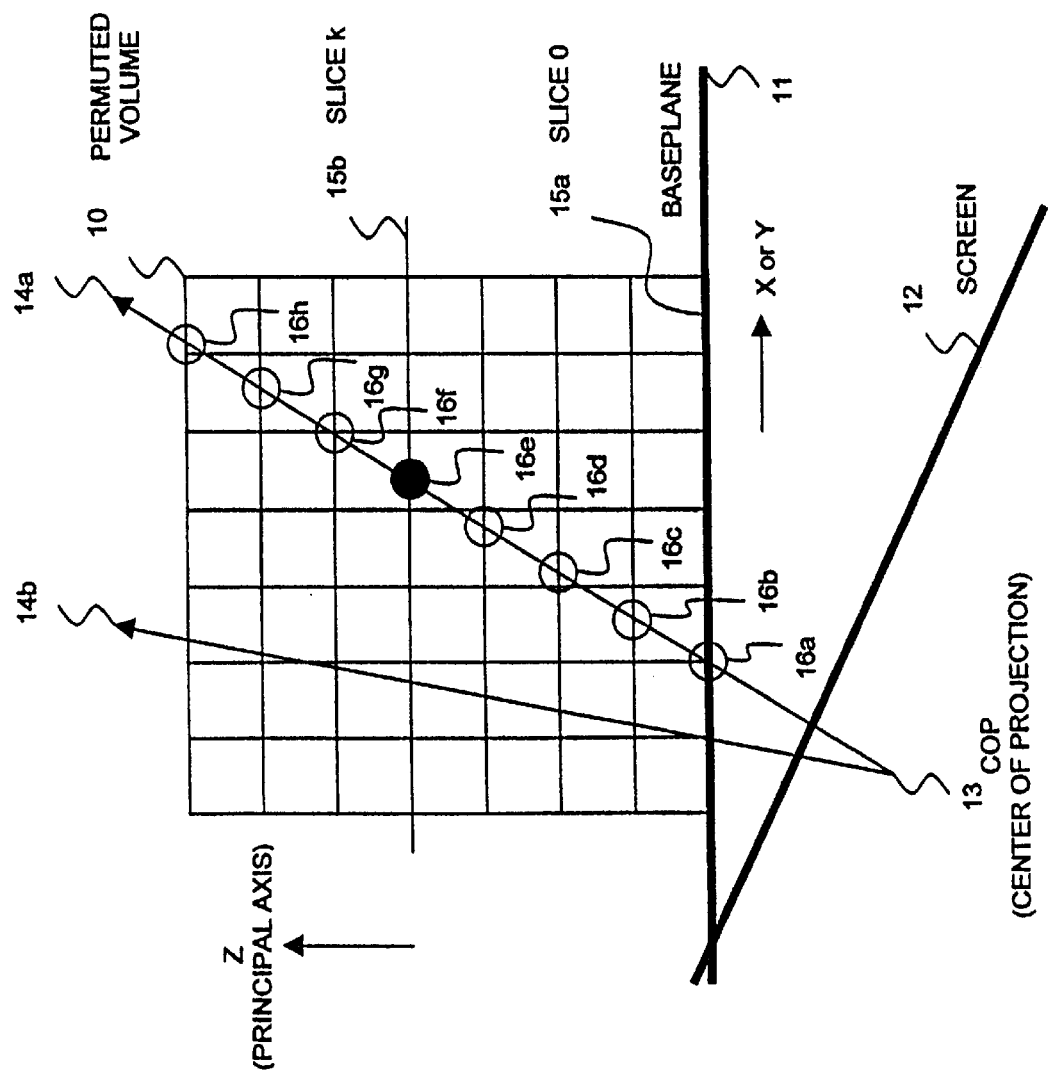
FIG. 3 is a schematic diagram illustrating perspective rays cast into a permuted volume to produce a baseplane image which is warped to a final image on a screen.
Figure 4:
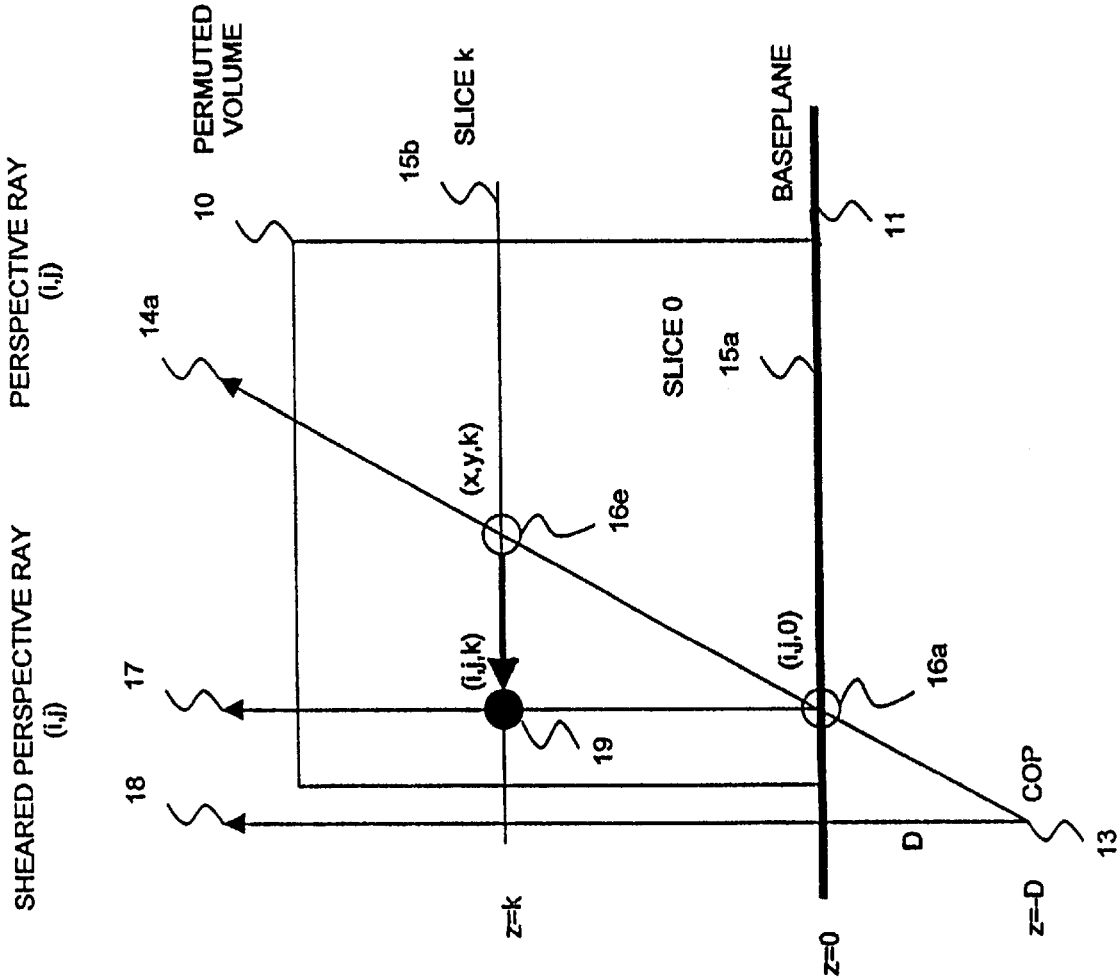
FIG. 4 is a schematic diagram of a shearing operation in raycasting.

FIG. 3 is a schematic diagram illustrating perspective rays cast into a permuted volume to produce a baseplane image. Two perspective rays 14a and 14b are cast from the center of projection 13 to permuted volume 10 through screen 12. Baseplane 11 coincides with the first slice of the permuted volume 10. The subject system casts perspective rays from the center of projection ("COP") so that each ray goes through a respective voxel in the first slice. Each perspective ray can be uniquely indexed by the index of the voxel in the first slice through which the ray passes. With reference also to FIG. 4, perspective ray 14a, for example, is indexed by (i,j) since it goes through the voxel indexed by (i,j), or x=i, y=j and z=0, in the first slice. The subject system computes color values at sampling points 16a through 16h along the ray 14a. Each sampling position along a ray is taken at a respective slice in the volume. For example, the first sampling position 16a of ray 14a is at slice 15a with z=0, and the sampling position 16e on the same ray is at slice 15b with z=k.

FIG. 4 is a schematic diagram of a shearing transformation. The subject system effectively performs this operation in its raycasting operations. Perspective ray 14a is cast from the center of projection ("COP") 13 into volume 10. Ray 18, drawn from the center of projection 13 perpendicular to baseplane 11, defines a distance D between the center of projection 13 and baseplane 11. Perspective ray 14a goes through the voxel indexed by (i,j) in the first slice with z=0 and has samples 16a and 16e at slices 15a and 15b, respectively. The shearing operation shears ray 14a to ray 17, which starts at the first sample position 16a and is perpendicular to baseplane 11. Sample 16e at (x,y,k) is sheared to sample 19 at (i,j,k). The subject system accumulates sample values along ray 14a, in permuted coordinates, to determine the pixel at (i,j) on baseplane 11. The pixel produced by ray 17 is equivalent to the pixel produced by ray 14a, but is defined in the baseplane coordinates. The baseplane image is a collection of pixels defined in the baseplane coordinates, and is ready for warping to generate the final screen image.

Figure 5:
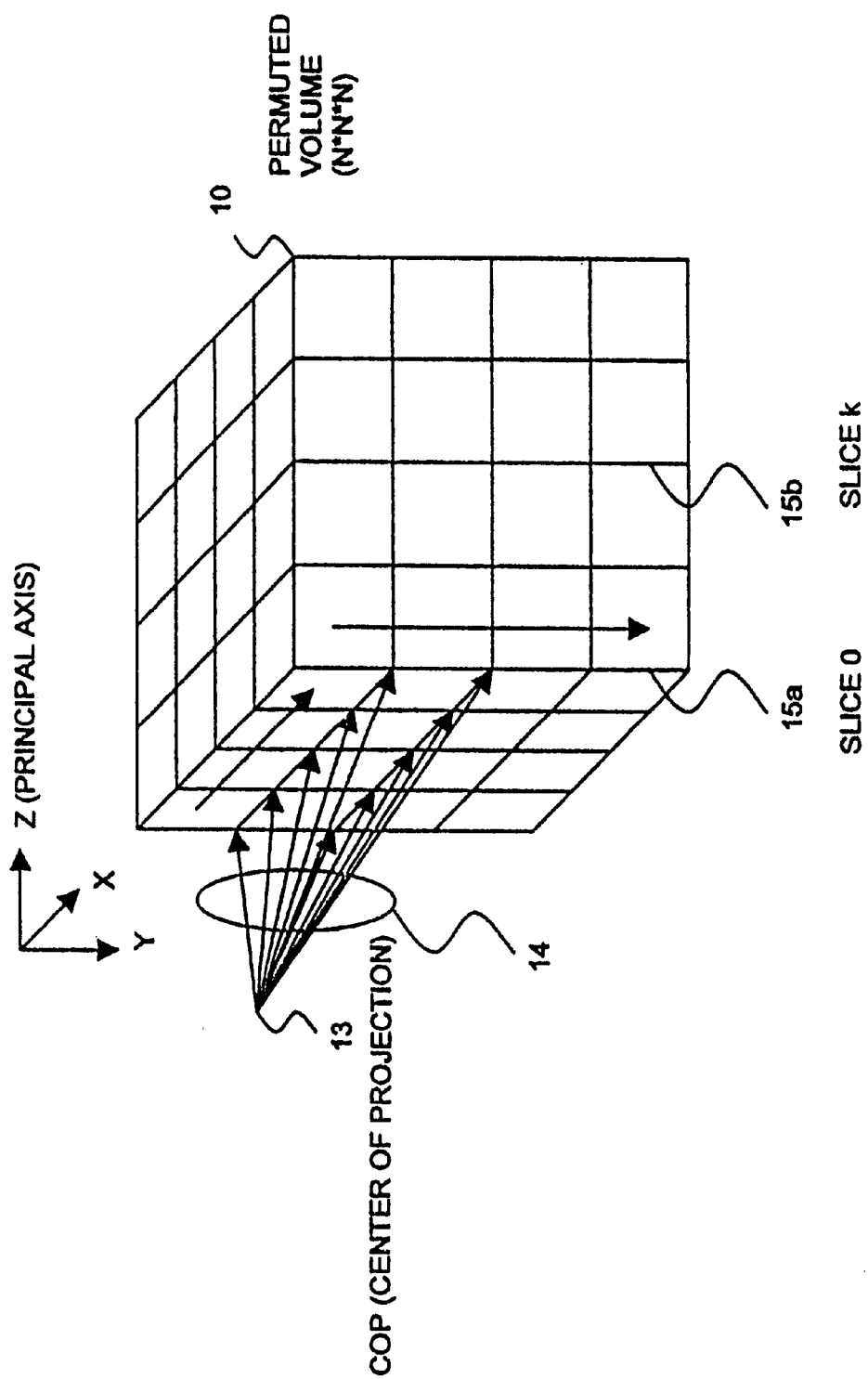
FIG. 5 is a schematic diagram showing the order in which perspective rays are cast into a permuted volume.

In FIG. 5, perspective rays 14 are cast from the center of projection 13 into permuted volume 10. For a volume of size N*N*N, each perspective ray indexed by (i,j) is given by an order number computed by i+j*N. The smaller the order number is, the earlier the ray is cast. The subject system casts a group of perspective rays. The number of perspective rays to cast at the same time is determined by the number of rendering pipelines, or rendering units 3a in the rendering module 3. Note that some of the perspective rays may not be cast because, for instance, they are out of the field of view.

Figure 6:
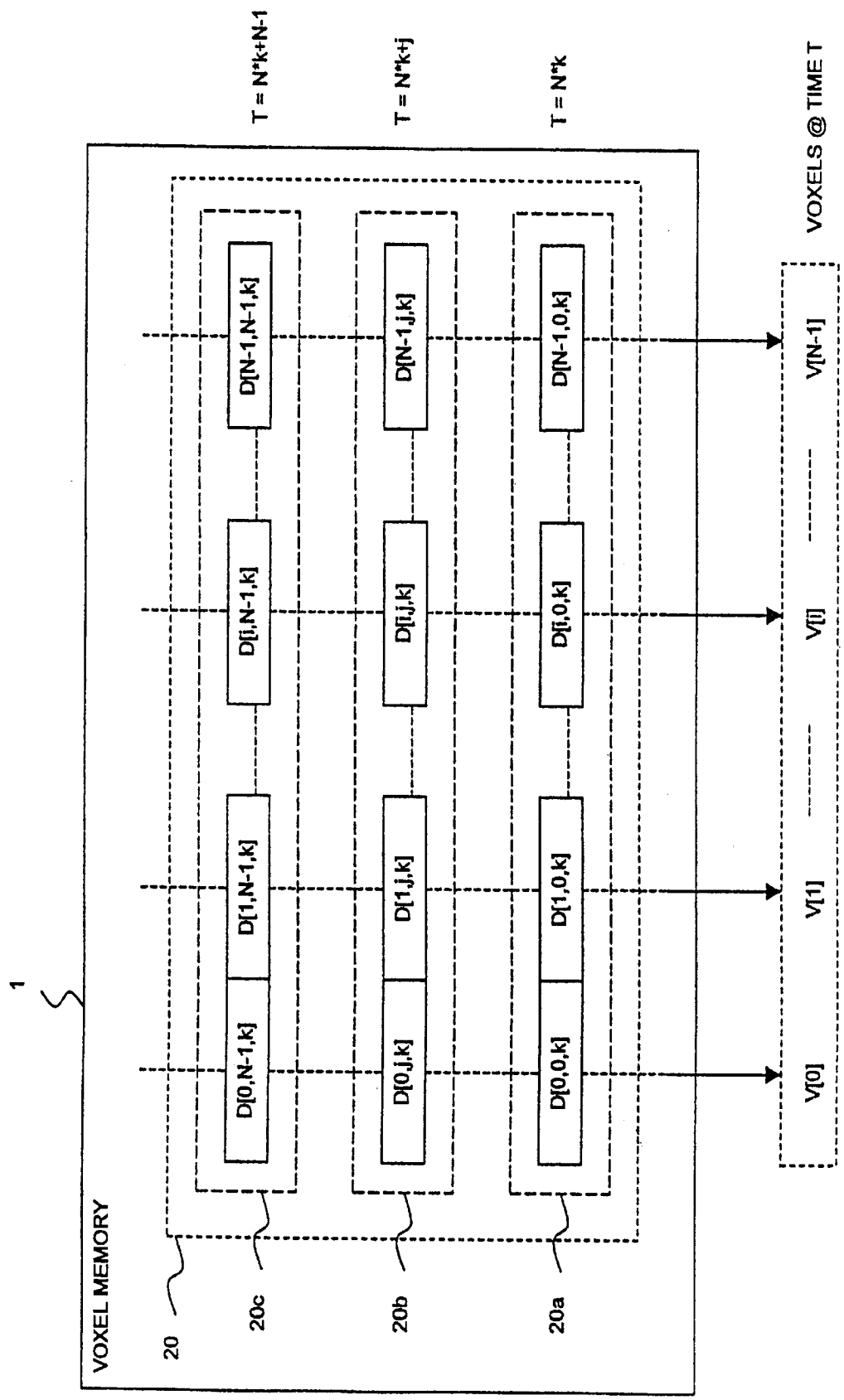
FIG. 6 is a schematic diagram of an arrangement of voxel data in a voxel memory.

In the subject system, each voxel is read from a voxel memory only once and retained in the resampling module 2 until all the samples requiring the voxel are computed. FIG. 6 shows the arrangement of voxel data in voxel memory 1 with the read timing for each. Voxels are read out from voxel memory 1 beam by beam. A beam is a set of voxels with the same y and z coordinates. In a slice of size N*N, there are N beams per slice. Slice 20 with z=k includes beam 20a with y=0, beam 20b with y=j, and beam 20c with y=N−1. Assuming that a beam is read out from voxel memory I in one clock cycle and is indexed by z=k and y=j, the beam is read out at time T=N*k+j.

Figure 7:
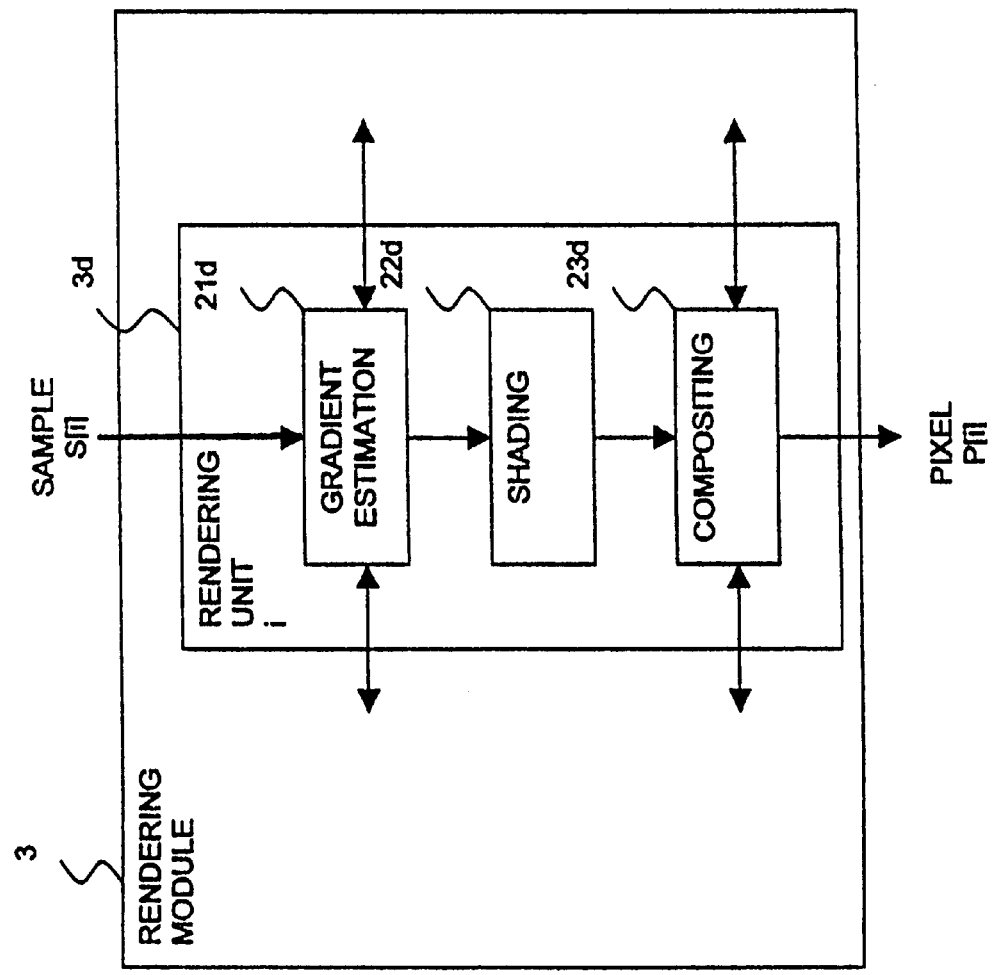
FIG. 7 is a block diagram illustrating the organization of rendering units in a rendering module.

FIG. 7 illustrates the organization of rendering units in rendering module 3. Rendering unit 3d receives sample S[i] from a respective resampling unit (not shown) and computes pixel P[i]. The rendering unit includes gradient estimation 21d, shading 22d, and compositing, 23d elements. Gradient estimation 21d estimates the gradient vector at the position of sample S[i] from the neighboring samples. Shading 22d performs the shading operations with sample S[i] and its gradient vector. Compositing 23d accumulates the shaded samples to produce pixel P[i]. For more detailed descriptions of these operations, see Hanspeter Pfister, Architectures for Real-Time Volume Rendering, Ph.D. Thesis, Department of Computer Science, State Universiity of New York at Stony Brook, December 1996.

Figure 8:
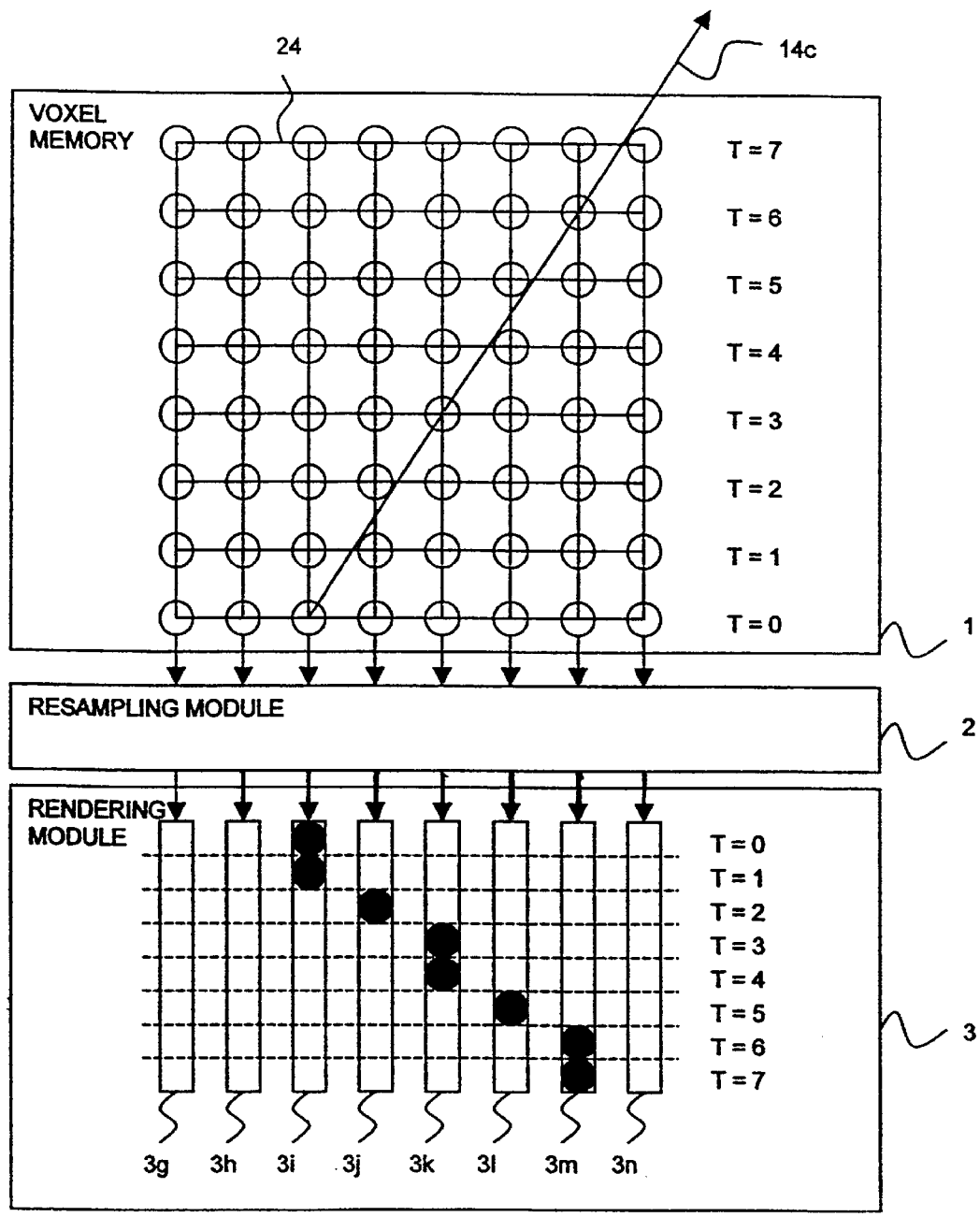
FIG. 8 is a schematic diagram showing different rendering units to compute samples along a perspective ray according to the present invention.

FIG. 8 schematically shows plural, parallel rendering units for computing samples along a perspective ray. Voxels in volume 24 are stored in voxel memory 1. Perspective ray 14c is used to generate samples, computed in resampling module 2, as inputs for rendering units 3i through 3m in rendering module 3. Each rendering unit may process samples for different rays. This is because each rendering unit is associated with a sequence of voxels with the same x and y indices.

Figure 9:
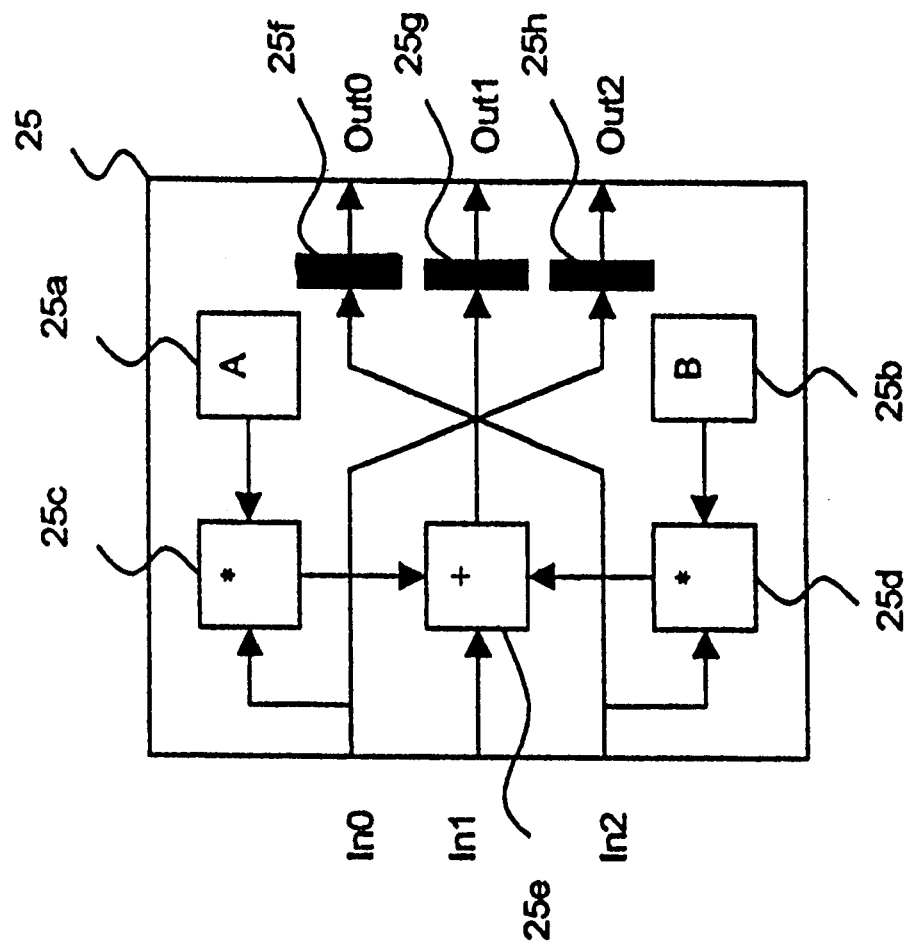
FIG. 9 is a block diagram of the organization of a weight-sum component to perform weight and sum operations in the resampling module of FIG. 1A.

A weight-sum component can be used as a building block to realize the weight and sum operations illustrated in FIG. 1A. FIG. 9 shows an example organization of the weight-sum component. Component 25 includes weight holders 25a and 25b, adder 25e, two multipliers 25c and 25d, and output registers 25f, 25g, and 25h. Weight holders 25a and 25b store weights A and B, respectively. In0, In1, and In2 are input data, and Out0, Out1, and Out2 are output data from registers 25f, 25g, and 25h, respectively. Registers 25f and 25h store In2 and In0, respectively, for forwarding these data to the next connected components. Register 25g stores In0*A+In1+In2*B.

Figure 10:
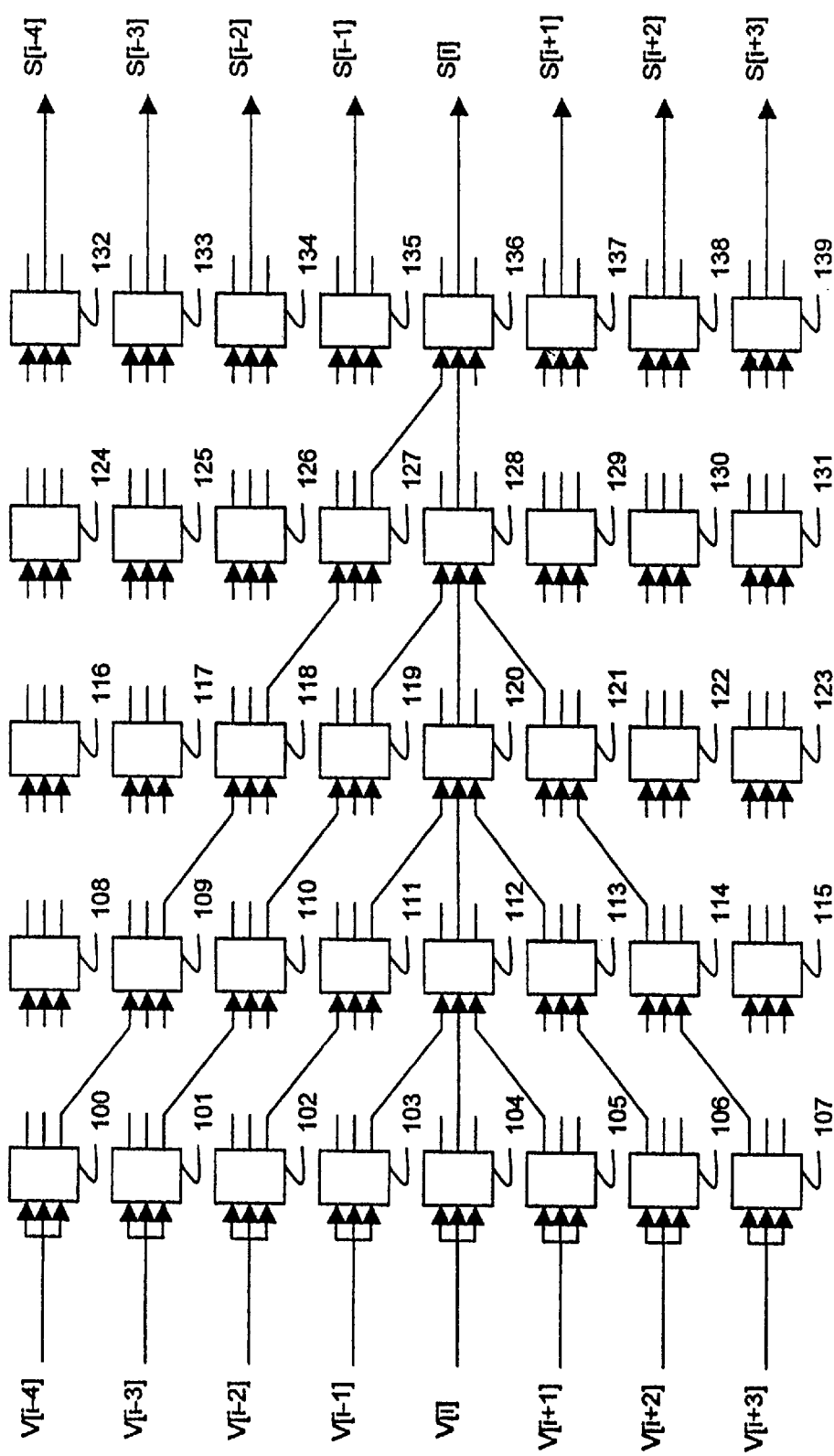
FIG. 10 is a block diagram of the arrangement of the weight-sum components illustrated in FIG. 9 to compute samples from voxels in the resampling module of FIG. 1A.

FIG. 10 shows an arrangement of weight-sum components 100 through 139 to compute samples, each produced from eight neighboring voxels. For example, sample S[i] is computed as follows:

$$S[i] = V[i-4]*w[i-4] + V[i-3]*w[i-3] +$$
$$V[i-2]*w[i-2] + V[i-1]*w[i-1] +$$
$$V[i]*w[i] + V[i+1]*w[i+1] +$$
$$V[i+2]*w[i+2] + V[i+3]*w[i+3]$$

where V[i−4] through V[i+3] are voxels and w[i−4] through w[i+3] weights. In order to compute sample S[i], weights w[i−4] through w[i+3] are loaded in the weight holders in the weight-sum components as follows:

| Component | A | B |
|---|---|---|
| 104 | w[i] | 0 |
| 112 | w[i − 1] | w[i + 1] |
| 120 | w[i − 2] | w[i + 2] |
| 128 | w[i − 3] | w[i + 3] |
| 136 | w[i − 4] | 0 |

Voxels V[I−4] through V[I+3] are forwarded to the components 112, 120, 128, and 138 as follows:

| Voxel | Forwarding Components |
|---|---|
| V[i − 4] | 100, 109, 118, 127 |
| V[i − 3] | 101, 110, 119 |
| V[i − 2] | 102, 111 |
| V[i − 1] | 103 |
| V[i] | none |
| V[i + 1] | 105 |
| V[i + 2] | 106, 113 |
| V[i + 3] | 107, 114, 121 |

In this example, up to eight voxels can be used to compute a sample. However, the number of voxels to compute a sample is not restricted to eight; it can be an arbitrary number. In contrast, in case of parallel projection, as known in the art, where the distance of neighboring rays is constant, up to two voxels are used to compute a sample.

The operations performed by perspective ray control 4 are now described. For simplicity of description, assume that N*N voxels in a slice are read out from voxel memory 1 at the same time so that N*N perspective rays can be processed at the same time. Under this assumption, there are N*N resampling units in resampling module 2. Perspective ray (i,j) is a ray cast from the center of projection 13 and going through the voxel position (i,j) in the first slice of a volume. Although there are a maximum of N*N perspective rays to be cast, some perspective rays may be invalid. Resampling units are also indexed by the voxel indices (i,j) in a slice of size N*N.

Figure 11:
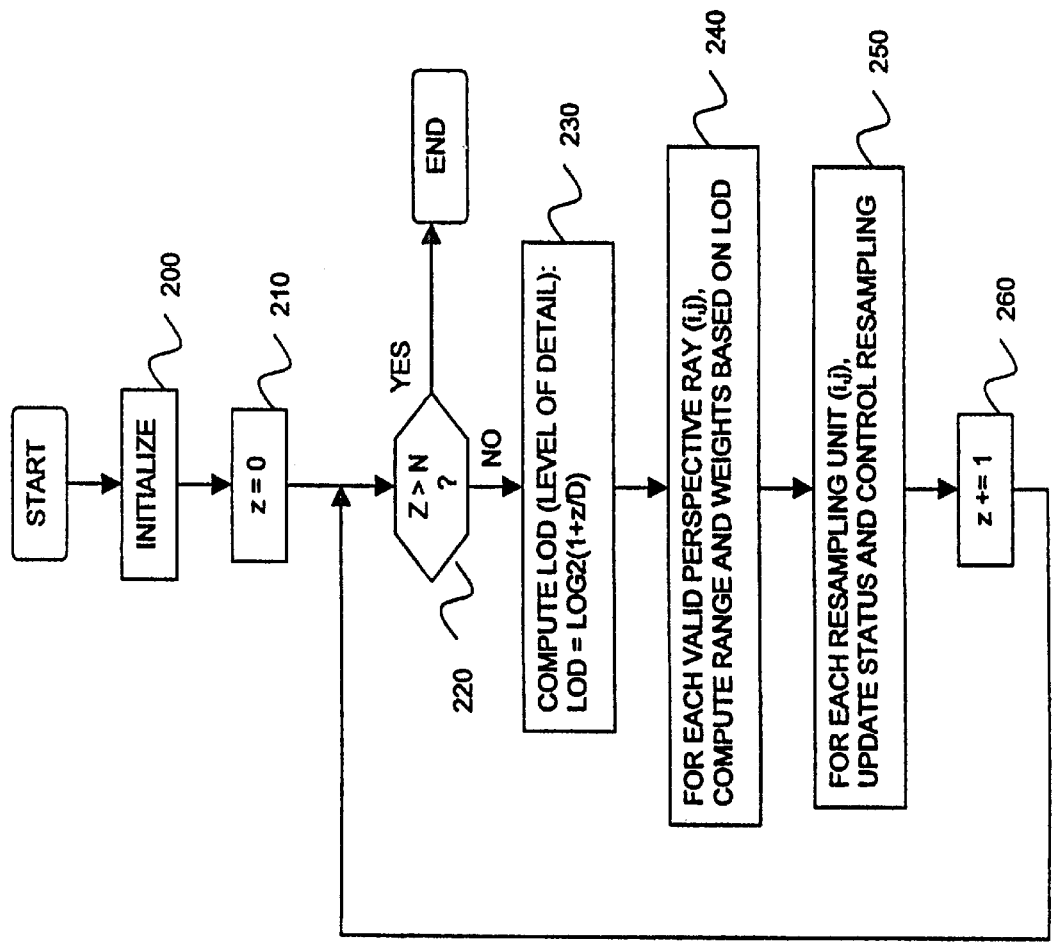
FIG. 11 is a flow chart of the top-level operations performed by the perspective ray control according to the present invention.

FIG. 11 shows a flow chart of the top-level operations performed by perspective ray control 4. The control first performs initialization at step 200, sets z to the initial slice number 0 at step 210, then goes into a raycasting loop. The slice number z controls the loop. At step 220, the value of z is checked to see if the current slice number is a valid number within a volume of size N*N*N. If z exceeds N, implying that the slice is outside the volume, the control terminates. Otherwise, the control computes the current LOD or Level of Detail at step 230 by $$LOD=LOG2(1+z/D),$$

where D is the shortest distance between the center of projection and the baseplane and LDG2 is a base-2 logarithm function. Using the computed current LOD, the control computes the range and weights for each valid perspective ray (i,j) at step 240 according to any suitable logic. Then the perspective ray control 4 controls resampling operations for each resampling unit in resampling module 2 at step 250. After completing these operations, the control increments the current slice number z by 1 for the next loop iteration at step 260. In the case of parallel projection, D is considered an infinity, and LOD is a constant 0.

Figure 12:
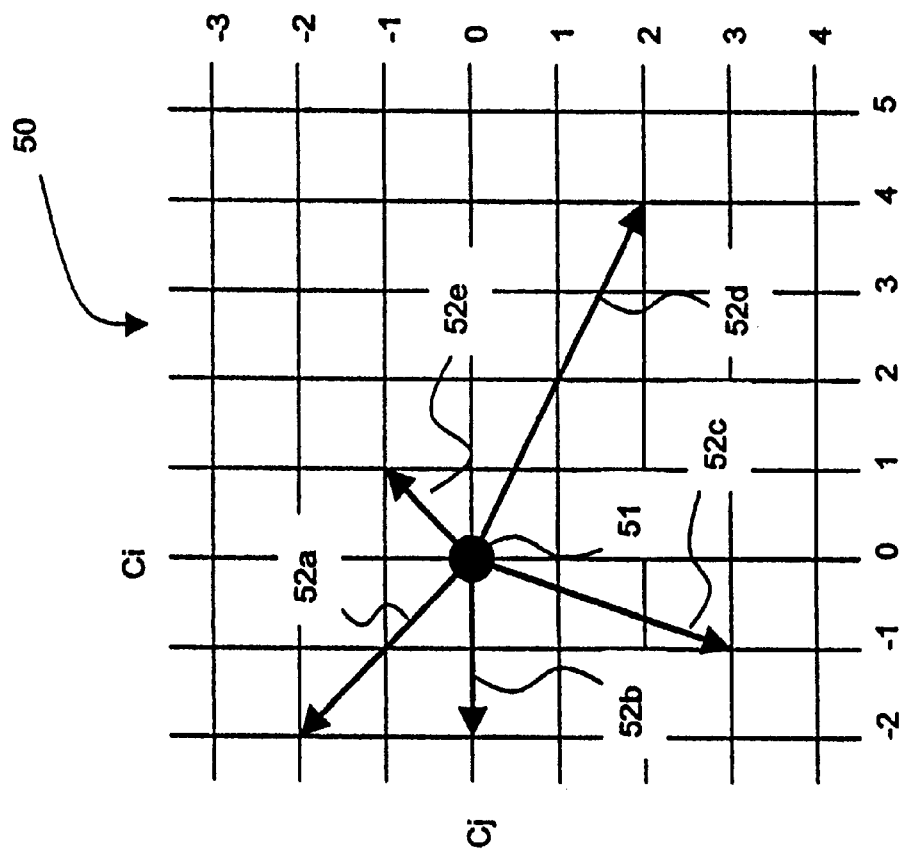
FIG. 12 is a schematic diagram of selected perspective rays cast into a volume.

FIG. 12 is a schematic diagram of selected perspective rays cast into a volume. In this front view, showing a part of the baseplane 50 containing the first slice of the volume and the center of projection 51, perspective rays 52a through 52e are cast from the center of projection 51 to the baseplane. The perspective center index pair (Ci,Cj) is determined by the x and y positions of the center of projection 51. A perspective index pair associated with each perspective ray is determined by the x and y distances from the perspective center (Ci,Cj). If a perspective ray is indexed by (i,j), then its perspective index pair is given by (i-Ci,j-Cj). For example, the perspective ray 52c has a perspective index pair (−1,3).

Figure 13:
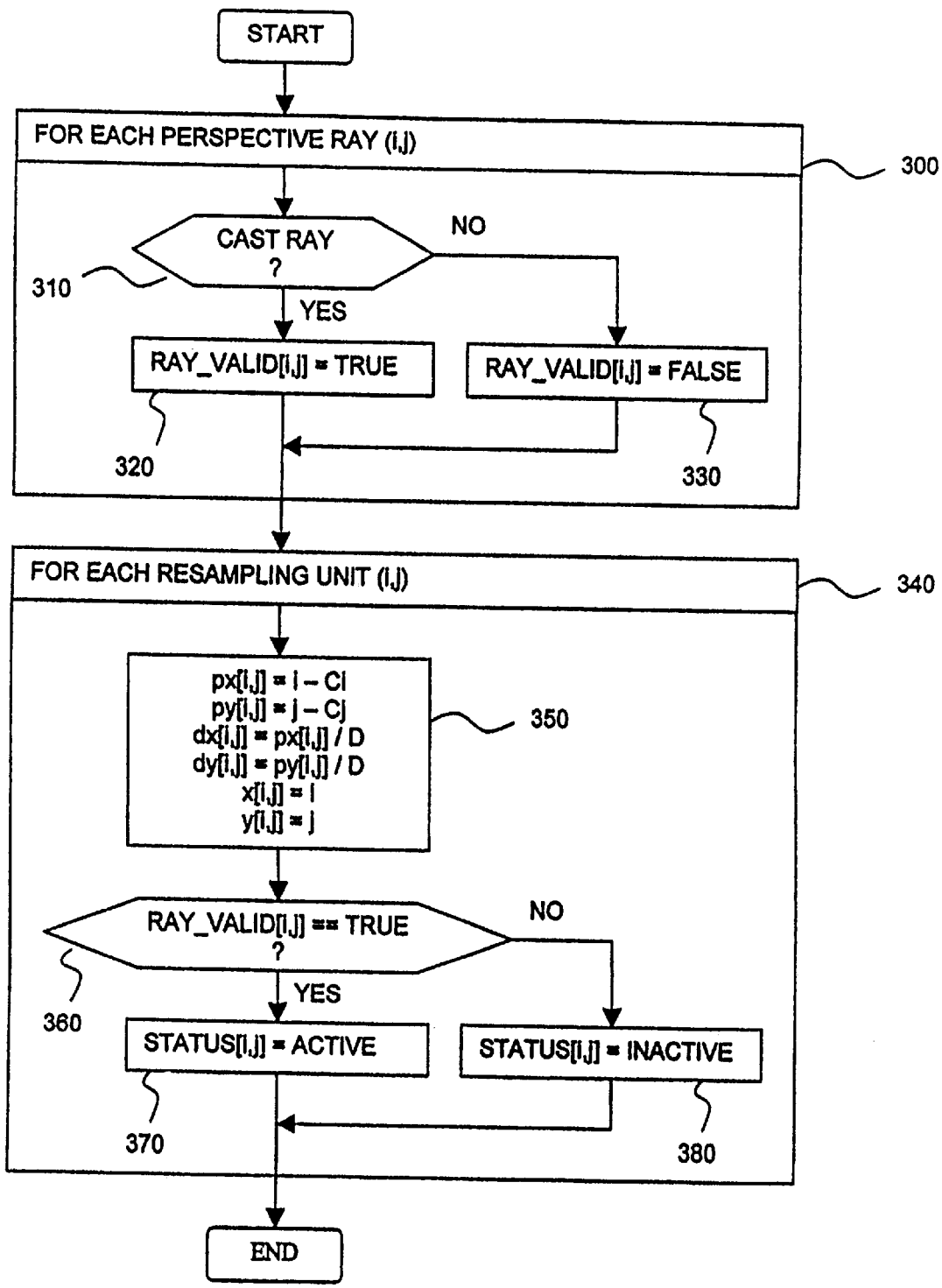
FIG. 13 is a flow chart of the initialization performed by a perspective ray control according to the present invention.

FIG. 13 shows a flow chart of the initialization performed by perspective ray control 4. For each perspective ray (i,j), a valid flag is set to valid or invalid at step 300. If valid, the ray (i,j) is to be cast at step 310. If cast, then the RAY_VALID[i,j] is set to TRUE at step 320; otherwise, it is set to FALSE at step 330. The following step 340 initializes the control parameters for each resampling unit (i,j). At step 350, the perspective indices px[i,j] and py[i,j] are set to i-Ci and j-Cj, respectively, where Ci and Cj are determined by the perspective ray from the COP and perpendicular to the baseplane;

the step values dx[i,j] and dy[i,j] are set to px[i,j]/D and py[i,j]/D, respectively; and the sampling position x[i,j] and y[i,j] are set to i and j, respectively.

If the perspective ray (i,j) is valid at step 360, then its status STATUS[i,j] is set to ACTIVE at step 370; otherwise, STATUS[i,j] is set to INACTIVE at step 380.

The perspective indices px[i,j] and py[i,j] are fixed and do not change for each perspective ray indexed by (i,j) once the center of projection is chosen before rendering. The perspective ray indexed by (i,j) is assumed to start at voxel position (i,j) in the first slice of a permuted volume because the initial sampling positions x[i,j] and y[i,j] are set to i and j, respectively. The initial step values in the x and y directions are set to px[i,j]/D and py[i,j]/D; the step values are functions of the distance of the center of projection and the perspective indices, but do not change in rendering.

Figure 14:
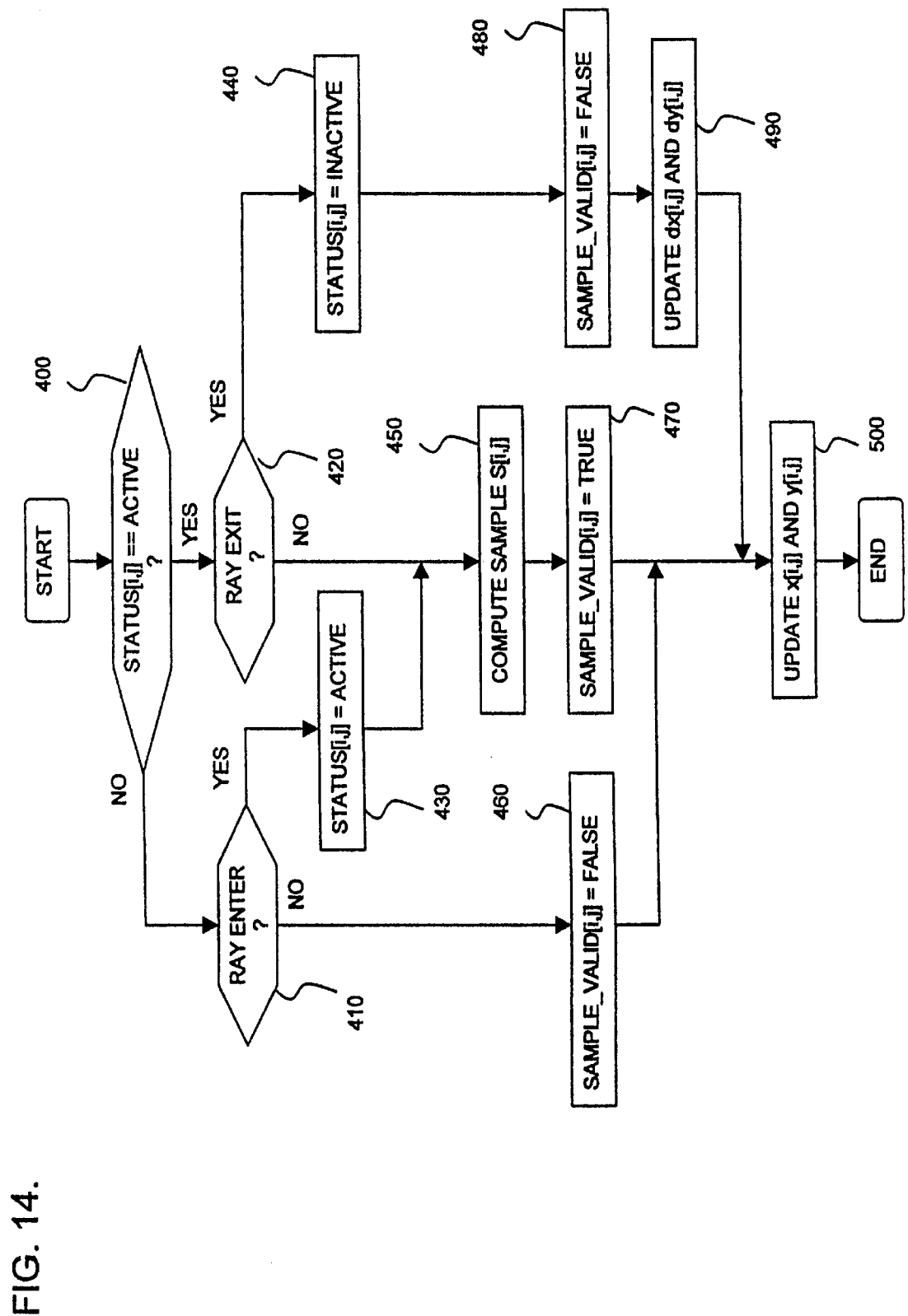
FIG. 14 is a flow chart of the operations performed at each sampling step by a perspective ray control according to the present invention.

FIG. 14 shows a flow chart of the operations performed at each sampling step by perspective ray control 4 for each perspective ray (i,j). If the ray status STATUS[i,j] is ACTIVE at step 400, then it is checked to see if the ray exits from the volume at step 420. If the ray exits at step 420, then STATUS[i,j] is set to INACTIVE at step 440, SAMPLE_VALID[i,j] is set to FALSE, the ray steps dx[i,j] and dy[i,j] are updated at 490, and the sampling positions x[i,j] and y[i,j] are updated at step 500. If the ray does not exit from the volume at step 420, then sample S[i,j] is computed at step 450, the SAMPLE_VALID[i,j] is set to TRUE at step 470, and the sampling positions x[i,j] and y[i,j] are updated at step 500. If the ray status STATUS[i,j] is not ACTIVE at step 400, then it is checked to see if the ray enters the volume at 410. If it does, then STATUS[i,j] is set to ACTIVE at step 430 and the following operations are steps 450, 470, and 500. If the ray does not enter the volume at step 410, then SAMPLE_VALID[i,j] is set to FALSE at step 460, and the sampling positions x[i,j] and y[i,j] are updated at step 500.

Updating the sampling positions x[i,j] and y[i,j] at step 500 is done by adding the aray steps dx[i,j] and dy[i,j] to the current values of x[i,j] and y[i,j], respectively. Updating the ray steps dx[i,j] and dy[i,j] at step 490 is performed by computing the ray steps for a new neighboring ray, which is expected to come. When a ray exits at step 420, it is signaled to the rendering module to finish compositing for the ray and to store the resulting pixel into the baseplane image memory.

Figure 15:
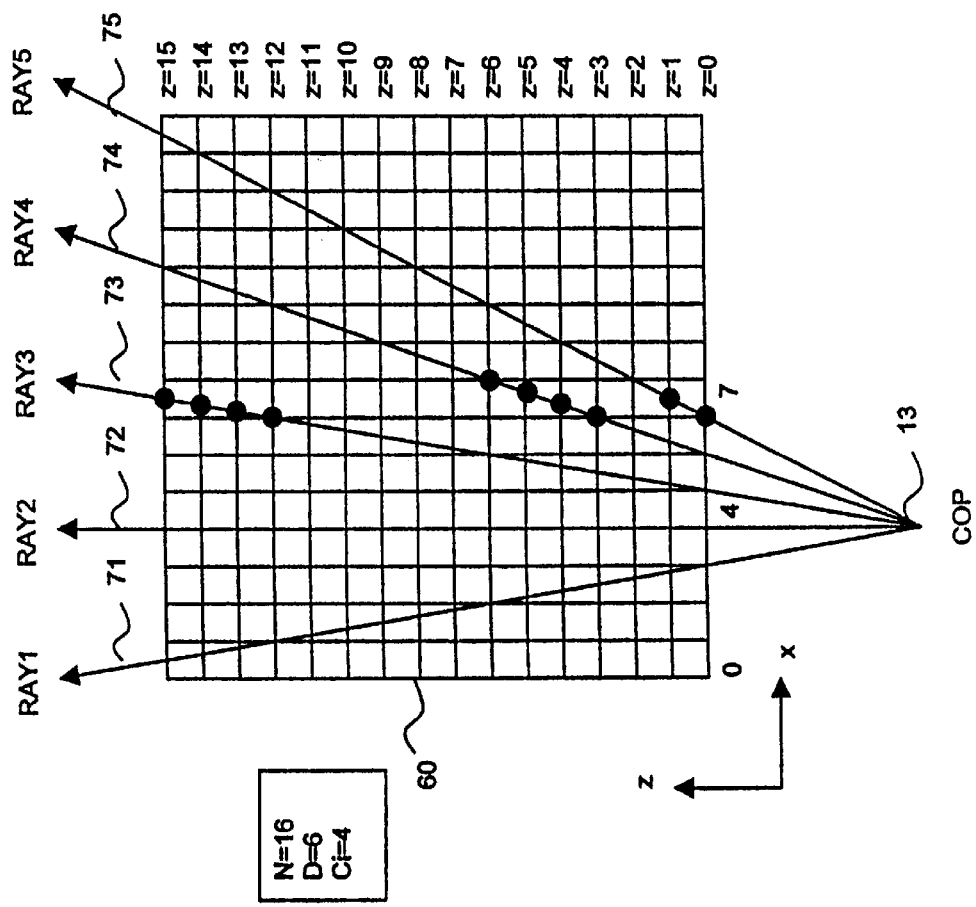
FIG. 15 is a schematic diagram of an example case of perspective rays cast into a volume.

FIG. 15 shows a schematic diagram of an example case of perspective rays cast into a volume of size 16*16*16 with D=6 and Ci=4. Perspective rays RAY1 through RAY5 71–75 are cast from the center of projection 13 into the volume 60. In this case, resampling unit 7 handles two samples for RAY5 75 at slices 0 and 1, four samples for RAY4 74 at slices 3 through 6, and four samples for RAY3 73 at slices 12 through 15. There are no valid samples at slices 2 and 7–11 for any rays for resampling unit 7. In this example, the smallest LOD is LOG2(1+0/6)=0, and the largest LOD is LOG2(1+15/6)=1.81. For practical purposes, LOD is actually computed by CEIL(LOG2(1+z/D)), where CEIL(x) is a ceiling function that returns the minimum integer greater than or equal to x.

Depending on the distance D of the center of projection, LOD can be arbitrary large. If the LOD is very large, a large number of voxels are required to compute a sample. It an actual implementation of the resampling module, the maximum number of voxels to compute a sample needs to be fixed because of the limited amount of hardware resource. If the LOD requires more than the maximum number of voxels, then weights of 0 are assumed for the out-of-range voxels.

As an enhancement of the subject system, a set of precalculated multi-resolution voxel datasets can be used to reduce the range of voxels used to compute a sample. Multi-resolution voxel datasets are those prepared for different levels of detail. A multi-resolution voxel for LOD=L covers 2*2*2 multi-resolution voxels for LOD=L−1. Voxels for LOD=0 are original voxels; a multi-resolution voxel for LOD=L covers POWER2(L)*POWER2(L)*POWER2(L) original voxels, where POWER2(L) raises 2 to the L-the power. A multi-resolution voxel can be obtained by simply averaging, for instance, eight lower-level voxels. A more sophisticated filter can also be used for this purpose.

Figure 16:
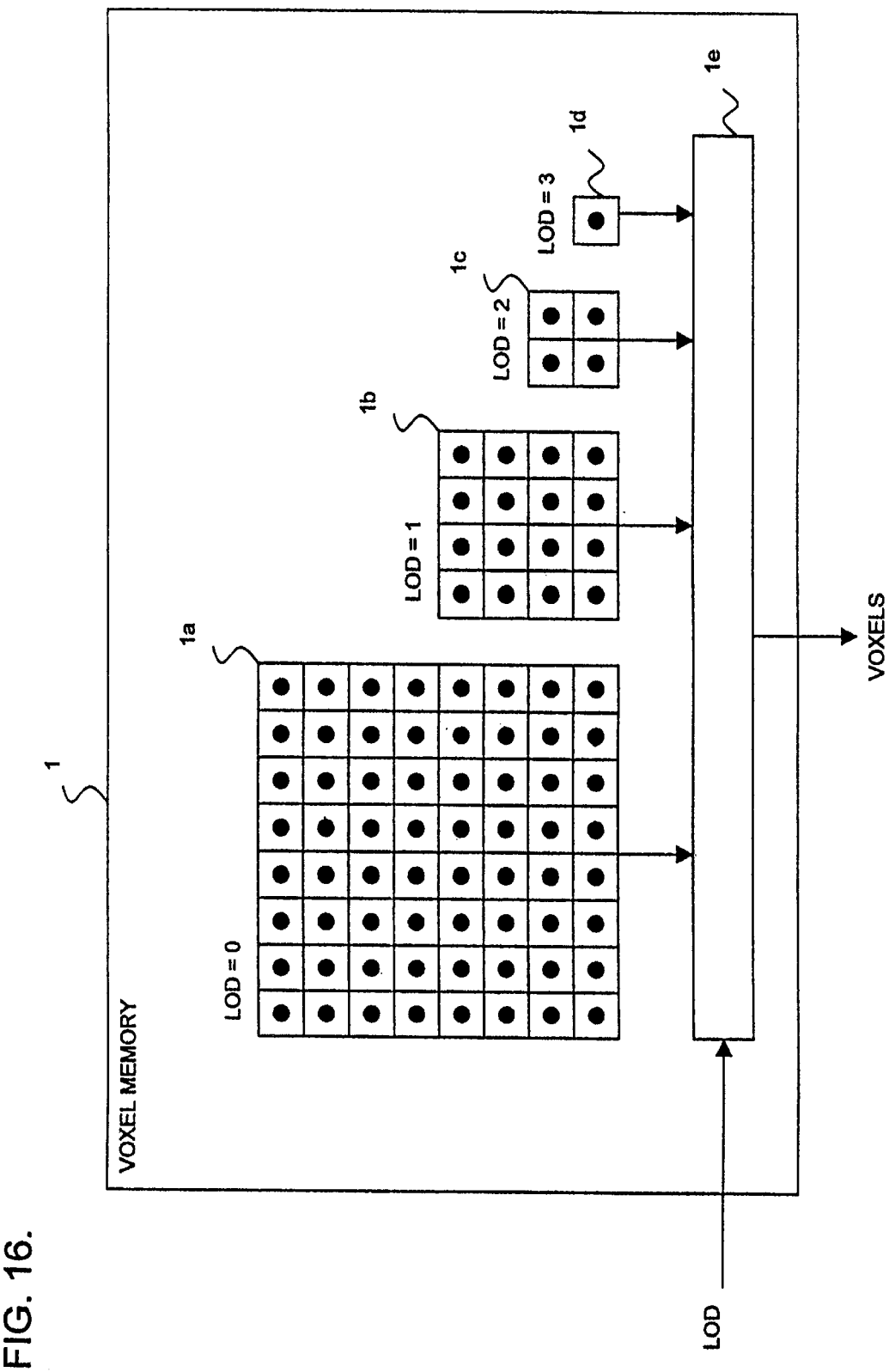
FIG. 16 is a schematic diagram illustrating multi-resolution voxel datasets according to the present invention for different levels of detail in a voxel memory.

FIG. 16 shows an example set of multi-resolution voxel datasets for different levels, of detail in voxel memory 1. Datasets 1a, 1b, 1c, and 1d are stored for LOD=0, 1, 2, and, 3, respectively. The sizes of these datasets are as follows:

| LOD | Dataset Size |
| --- | --- |
| 0 | 8*8*8 |
| 1 | 4*4*4 |
| 2 | 2*2*2 |
| 3 | 1*1*1 |

Selector 1e selects one of the datasets for the current LOD computed by the perspective ray control. Once an appropriate voxel dataset is chosen, voxels are read from that dataset until the new LOD is computed by the perspective ray control.

The use of multi-resolution voxel datasets for different levels of detail can simplify the resampling module because a sample can be computed from a smaller number of multi-resolution voxels than the number of original voxels. Since the level of detail reflects the distance between two neighboring perspective rays, the number of original voxels within this distance is determined by the LOD. For LOD=L, there are at most two multi-resolution voxels with LOD=L within the distance of two neighboring perspective rays, while there are at most POWER2(L) original voxels. A sample can therefore be computed from two multi-resolution voxels with LOD=L, instead of using POWER2(L) original voxels.

Figure 17:
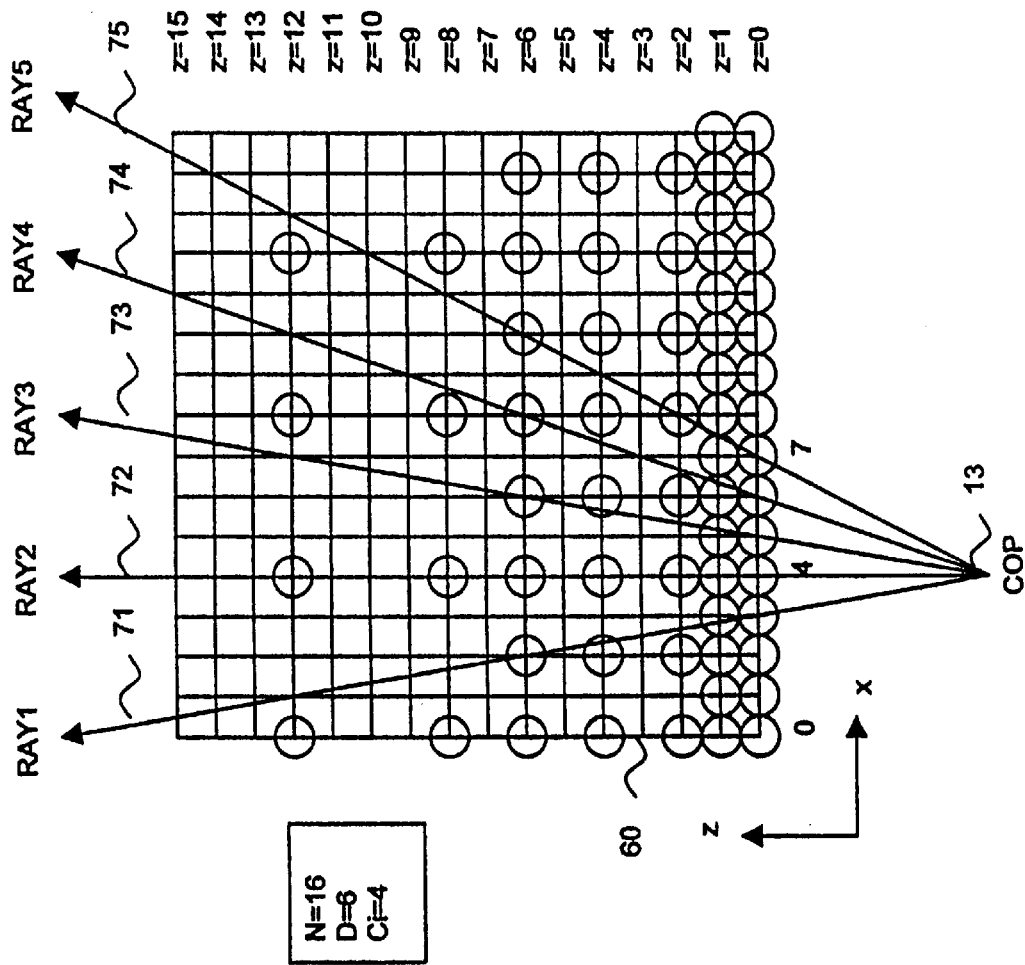
FIG. 17 is a schematic diagram of the example case shown in FIG. 15 with multi-resolution voxel datasets for different levels of detail; and, FIG. 18 is a flow chart of the top-level operations performed by the perspective ray control of the present invention for multi-resolution voxel datasets for different levels of detail.

FIG. 17 is a schematic diagram of the same example case shown in FIG. 16 with multi-resolution voxel datasets for different levels of detail. Voxels for L=0 are used at z=0 and 1, voxels for L=1 at z=2, 4, and 6, and voxels for L=2 at z=8 and 12. In this example, it is assumed that voxels for LOD=L are used at z=L*i, where i is a non-negative integer. Because of this assumption, voxels for L=0 are used at z=1, although the LOD at z=1 is 1. Stepping in the z-direction is adjusted to the LOD so that samples be taken at z=L*i.

Figure 18:
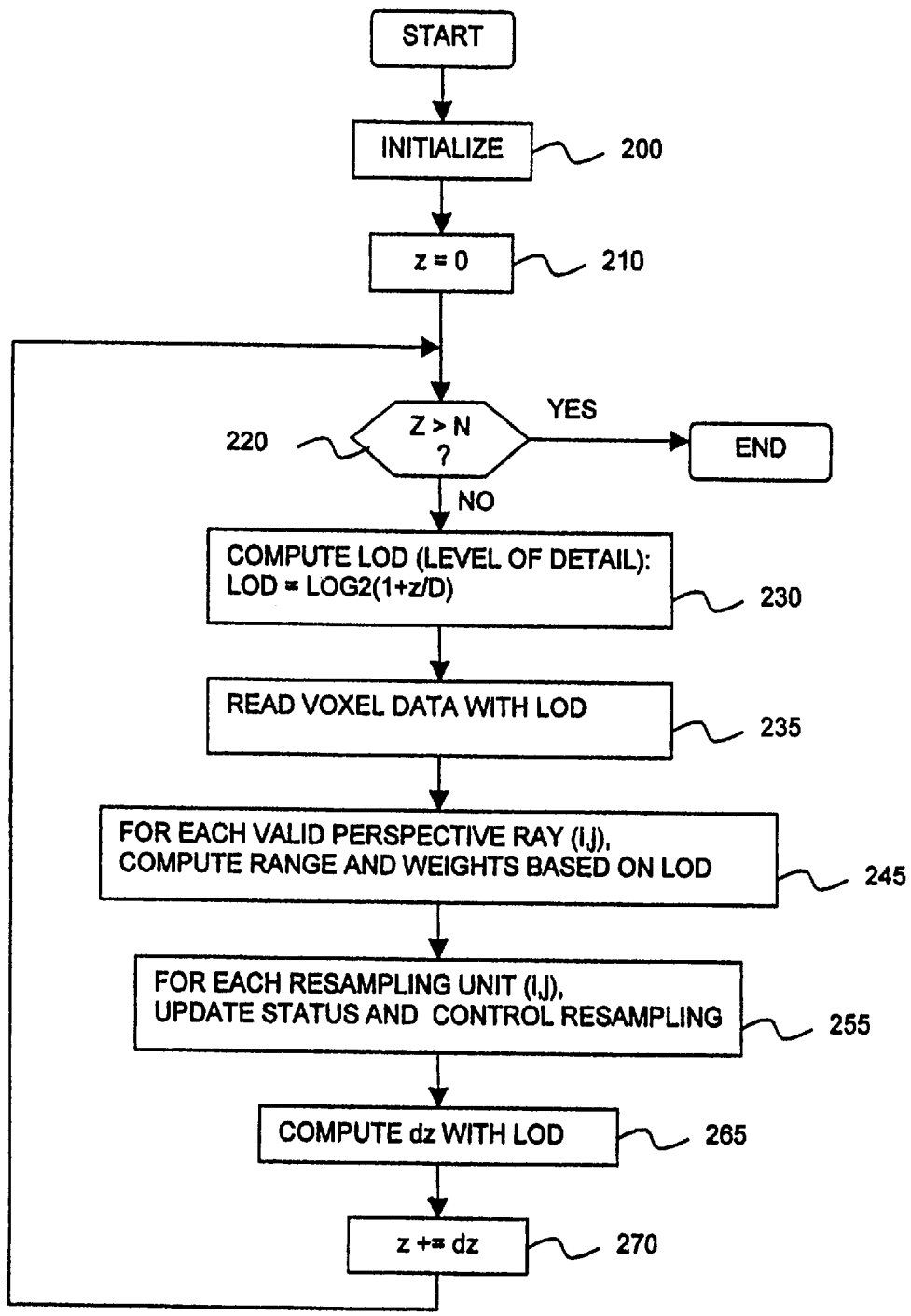

FIG. 18 shows a flow chart of the top-level operations performed by the perspective ray control for a volume with multi-resolution voxel datasets for different levels of detail. Steps 200, 210, 220, and 230 are the same as those in FIG. 12. The computed LOD is sent to the voxel memory at step 235 to retrieve to the multi-resolution voxel dataset corresponding to the LOD. Step 245 is similar to step 240 in FIG. 11 but with the range and weights computed for multi-resolution voxels. Step 255 is also similar to step 250 in FIG. 11 but with multi-resolution voxels. Step 265 computes the next z-step from the LOD and current z location. The z location is updated by adding the z-step to the current z location at step 270.

There are many possible variations of the subject system described above. For instance, the range of voxels for resampling can be arbitrary, even though it is preferentially limited. The weights for voxels in resampling can be determined by any suitable function or element. The number of resampling units and rendering units is fixed but can be arbitrary, depending upon factors such as expense and size. Multi-resolution voxel datasets can be generated by any reasonable means.

These and other examples of the concept of the invention illustrated above are intended by way of example and the actual scope of the invention is to be determined from the following claims.

What is claimed is:

1. A volume rendering system for enabling parallel-pipeline processing of perspective rays cast into a volume to be rendered by parallizing perspective rays, comprising:
   a memory for storing plural voxels, said voxels collectively describing said volume to be rendered;
   a resampling unit for selectively receiving a subset of said voxels from said memory, said subset of said voxels proximate to a sample along a particular ray, and for combining said subset of voxels into said sample;
   a rendering module for receiving said sample and for selectively combining said sample with other samples along said particular ray received from said resampling unit to generate a single pixel centered on said particular ray; and
   a perspective ray control element, in communication with said memory, said resampling unit, and said rendering module, for casting said particular ray through said single pixel.

2. The volume rendering system of claim 1, wherein said perspective ray control is for identifying which of said plural voxels are to comprise said subset of said voxels.

3. The volume rendering system of claim 1, wherein said perspective ray control is for specifying to said resampling unit a weight to be applied to each voxel of said subset of voxels.

4. The volume rendering system of claim 1, wherein said perspective ray control is for specifying to said resampling unit a range of voxels of said subset of voxels to be combined in the generation of said sample.

5. The volume rendering system of claim 1, wherein said rendering module further comprises a gradient estimation unit, a shading unit, and a compositing unit for compositing said samples.

6. The volume rendering system of claim 5, wherein said perspective ray control is for adjusting said gradient estimation and shading units.

7. The volume rendering system of claim 1, further comprising a baseplane image memory for storing said pixel and other pixels received from said rendering unit.

8. The volume rendering system of claim 1, wherein said perspective ray control is further for calculating a level of detail for said sample, said level of detail effecting a weight to be applied to each voxel of said subset of voxels by said resampling unit and a range of voxels of said subset of voxels to be combined by said resampling unit.

9. The volume rendering system of claim 8, wherein said perspective ray control is further for calculating said level of detail based upon a distance from a center of projection for plural perspective rays to a baseplane and on a current position of said sample generated by said resampling unit.

10. A volume rendering system for enabling parallel-pipeline processing of perspective rays cast into a volume to be rendered by parallelizing perspective rays, comprising:
    a voxel memory for storing plural voxels collectively describing said volume to be rendered;
    a dataset memory for storing plural multi-resolution datasets;
    a resampling unit for selectively receiving a subset of said multi-resolution datasets from said memory, said subset proximate to a sample along a particular ray, and for combining said subset into a sample;
    a rendering module for receiving said sample and for combining said sample with other samples along said particular ray received from said resampling unit to generate a single pixel;
    a perspective ray control element, in communication with said dataset memory, said resampling unit, and said rendering module, for casting said particular ray through said single pixel; and
    a processor in communication with said voxel memory and said dataset memory,
    wherein said processor calculates said multi-resolution datasets based upon said voxels, such that said multi-resolution datasets represent each position within said volume to be rendered at varying degrees of resolution.

11. The volume rendering module of claim 10, wherein said perspective ray control is for identifying which of said plural multi-resolution datasets are to comprise said subset of said multi-resolution datasets.

12. The volume rendering system of claim 10, wherein said perspective ray control is for specifying to said resampling unit a weight to be applied to each multi-resolution dataset of said subset of multi-resolution datasets.

13. The volume rendering system of claim 10, wherein said perspective ray control is for specifying to said resampling unit a range of multi-resolution datasets of said subset of multi-resolution datasets which are to be combined in the generation of said sample.

14. The volume rendering system of claim 10, wherein said rendering module further comprises a gradient estimation unit, a shading unit, and a compositing unit for compositing said samples.

15. The volume rendering system of claim 14, wherein said perspective ray control is for adjusting said gradient estimation and shading units.

16. The volume rendering system of claim 10, further comprising a baseplane image memory for storing said pixel and other pixels received from said rendering unit.

17. The volume rendering system of claim 10, wherein said perspective ray control is further for calculating a level of detail for said sample, said level of detail effecting which of said multi-resolution datasets are to comprise said subset of multi-resolution datasets.

18. The volume rendering system of claim 17, wherein said perspective ray control is further for calculating said level of detail based upon a distance from a center of projection for plural perspective ray s to a baseplane and on a current position of said sample generated by said resampling unit.

19. A method of rendering a multi-dimensional volume on a baseplane via parallel-pipeline processing of perspective rays cast into said volume as parallelized perspective rays, comprising the steps of:

storing a representation of said volume as a plurality of voxels in a voxel memory;

retrieving a subset of said voxels from said memory by a resampling unit, said subset of said voxels proximate to a sample along a particular ray;

determining a range of said subset of voxels to be processed by said resampling unit;

determining a weight to be applied to each of said subset of voxels to be processed by said resampling unit;

compositing said weighted voxels within said range of voxels, by said resampling unit, to generate said sample; and rendering a pixel from said sample and from other samples along said particular ray received from said resampling unit by a rendering module.

20. The method of claim 19, further comprising the step of calculating a level of detail for a sample to be calculated in a perspective ray control unit, and providing said level of detail to said resampling unit for use in said steps of determining a range and determining a weight.

21. The method of claim 20, wherein said step of calculating is preceded by the steps of:

calculating a distance from a center of projection for a set of perspective rays cast into said volume; and calculating the relative position of a sample to be calculated within said volume, wherein said distance and relative position are utilized in said step of calculating a level of detail.

22. A method of rendering a multi-dimensional volume on a baseplane via parallel-pipeline processing of perspective rays cast into said volume as parallelized perspective rays, comprising the steps of:

storing a representation of said volume as a plurality of voxels in a voxel memory;

generating a set of multi-resolution datasets from said voxels, said multi-resolution datasets representing each position within said volume at varying degrees of resolution, retrieving a subset of said multi-resolution datasets from said memory by a resampling unit;

determining a range of said subset of said multi-resolution datasets to be processed by said resampling unit;

determining a weight to be applied to each of said subset of said multi-resolution datasets to be processed by said resampling unit;

compositing said weighted multi-resolution datasets within said range of multi-resolution datasets, by said resampling unit, to generate a sample; and rendering a pixel from said sample and from other samples received from said resampling unit by a rendering module.

23. The method of claim 22, further comprising the step of calculating a level of detail for a sample to be calculated in a perspective ray control unit, and providing said level of detail to said resampling unit for use in said steps of determining a range and determining a weight.

24. The method of claim 23, wherein said step of calculating is preceded by the steps of:

calculating a distance from a center of projection for a set of perspective rays cast into said volume; and calculating the relative position of a sample to be calculated within said volume, wherein said distance and relative position are utilized in said step of calculating a level of detail.

25. A method for rendering voxels onto a baseplane including a plurality of pixels using parallel processing pipelines, comprising the steps of:

casting a perspective ray, for each pixel of the baseplane, through the voxels, each perspective ray including a plurality of sample points;

sampling voxels proximate to each sample point along a particular ray associated with a particular pixel in the parallel processing pipelines; and accumulating the sampled voxels of each sample point along the particular ray into the particular pixel of the baseplane to perspectively render the voxels using the parallel processing pipelines.

26. The method of claim 25 further comprising the step of:

weighting the sampled voxels according to a proximity to each sample point in parallel.

* * * * *